United States Patent
Iinuma

(10) Patent No.: US 9,489,603 B2
(45) Date of Patent: Nov. 8, 2016

(54) IMAGE PROCESSING APPARATUS, IMAGE PROCESSING METHOD, AND STORAGE MEDIUM THAT DETERMINE WHETHER A WHITE CHARACTER EXISTS INSIDE A GRAPHICS OBJECT AND CONVERT DENSITY INFORMATION ACCORDINGLY

(71) Applicant: CANON KABUSHIKI KAISHA, Tokyo (JP)

(72) Inventor: Osamu Iinuma, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/475,659

(22) Filed: Sep. 3, 2014

(65) Prior Publication Data
US 2015/0070715 A1    Mar. 12, 2015

(30) Foreign Application Priority Data

Sep. 12, 2013 (JP) ................................. 2013-189418

(51) Int. Cl.
| | |
|---|---|
| G06K 15/02 | (2006.01) |
| G06K 15/00 | (2006.01) |
| G06K 15/12 | (2006.01) |
| G06K 15/10 | (2006.01) |
| H04N 1/58 | (2006.01) |

(52) U.S. Cl.
CPC ........... *G06K 15/407* (2013.01); *G06K 15/102* (2013.01); *G06K 15/128* (2013.01); *G06K 15/129* (2013.01); *G06K 15/1843* (2013.01); *H04N 1/58* (2013.01)

(58) Field of Classification Search
CPC ............................. G06K 15/407; H04N 1/58
USPC ................................ 358/1.1–3.29, 1.11–1.18
See application file for complete search history.

(56) References Cited

U.S. PATENT DOCUMENTS

| | | | |
|---|---|---|---|
| 5,751,434 A | 5/1998 | Narendranath et al. | |
| 6,198,468 B1* | 3/2001 | Cho | ................... H04N 5/44504 248/917 |

(Continued)

FOREIGN PATENT DOCUMENTS

| | | |
|---|---|---|
| JP | 2002-086805 A | 3/2002 |
| JP | 2008-027190 A | 2/2008 |

(Continued)

OTHER PUBLICATIONS

Communication and European Search Report completed Feb. 9, 2015, and mailed Feb. 24, 2015, issued in counterpart European Patent Application No. 14002893.7-1502.

(Continued)

*Primary Examiner* — Marcellus Augustin
(74) *Attorney, Agent, or Firm* — Fitzpatrick, Cella, Harper & Scinto

(57) ABSTRACT

An image processing apparatus includes a determining unit to determine whether or not a white character exists inside a graphics object. In a case when recording material saving processing is instructed and the determining unit determines that the white character exists inside the graphics object, a conversion unit converts the character so as to increase the density thereof and converts a region other than the character inside the graphics object so as to decrease the density thereof. An image forming device forms an image based on the conversions performed by the conversion unit.

15 Claims, 16 Drawing Sheets

(56) References Cited

U.S. PATENT DOCUMENTS

| | | |
|---|---|---|
| 7,602,510 B2 | 10/2009 | Rombola et al. |
| 7,760,395 B2 | 7/2010 | Torikoshi |
| 7,880,927 B2 | 2/2011 | Usui et al. |
| 8,284,467 B2 | 10/2012 | Patton et al. |
| 2003/0197880 A1* | 10/2003 | Nakao ............... H04N 1/40012 358/1.9 |
| 2004/0190029 A1 | 9/2004 | Rombola et al. |
| 2008/0055620 A1 | 3/2008 | Usui et al. |
| 2008/0079962 A1 | 4/2008 | Torikoshi |
| 2008/0094517 A1* | 4/2008 | Takeuchi et al. ............. 348/649 |
| 2008/0170247 A1 | 7/2008 | Patton et al. |
| 2009/0201522 A1* | 8/2009 | Iguchi ........................... 358/1.9 |
| 2011/0157614 A1 | 6/2011 | Ueda et al. |
| 2013/0235392 A1* | 9/2013 | Iinuma .......................... 358/1.2 |

FOREIGN PATENT DOCUMENTS

| | | |
|---|---|---|
| JP | 2008-135006 A1 | 6/2008 |
| JP | 2009-172970 A | 8/2009 |

OTHER PUBLICATIONS

Korean Official Action dated May 4, 2016, issued in corresponding Korean Patent Application No. 10-2014-0115187.
English translation of Korean Official Action issued May 4, 2016, in corresponding Korean Patent Application No. 10-2014-0115187.
Chinese Official Action dated Aug. 24, 2016, issued in corresponding Chinese Patent Application No. 20141046539.8, with an English translation.

\* cited by examiner

IMAGE PROCESSING APPARATUS, IMAGE PROCESSING METHOD, AND STORAGE MEDIUM THAT DETERMINE WHETHER A WHITE CHARACTER EXISTS INSIDE A GRAPHICS OBJECT AND CONVERT DENSITY INFORMATION ACCORDINGLY

CLAIM OF PRIORITY

This application claims the benefit of Japanese Patent Application No. 2013-189418, filed Sep. 12, 2013, which is hereby incorporated by reference herein in its entirety.

BACKGROUND OF THE INVENTION

1. Field of the Invention

The present invention relates to an image processing apparatus for performing toner saving processing on image data, and an image processing method.

2. Description of the Related Art

A processing mode in order to suppress an amount of consumed color materials of an image forming device, i.e., a mode in which a so-called toner-saved printout is produced, is widely known as a function to save printing costs by decreasing the density at the time of printing. Further, in recent years, the image quality equivalent to that output at the time of normal printing is also required for toner saving output processing while saving the printing cost.

As one of the processing methods, there is a method for outputting the image quality equivalent to that output at the time of normal printing by detecting an edge and removing the color from an inner region surrounded by the detected edge so as to leave the edge for enhancement (e.g., Japanese Patent Laid-Open No. 2002-086805).

There is, however, such a problem that, for example, in a case when there is a solid-white character in the inner region surrounded by the edge, the removal of color from the inner region considerably degrades visibility of, in particular, the white character.

SUMMARY OF THE INVENTION

The image processing apparatus of the present invention is an image processing apparatus, having an extraction unit configured to extract a graphics object from image data, and a conversion unit configured, in a case when recording material saving processing is instructed and a character whose density is equal to or less than a predetermined density is included inside a graphics object extracted by the extraction unit, to convert the character, so as to increase the density thereof, and to convert a region other than the character inside the graphics object, so as to decrease the density thereof.

According to the present invention, it is made possible to keep visibility of a white character even in a case when the white character exists inside an object whose edge is left, and from which colors of other portions are removed, at the time of toner saving processing.

Further features of the present invention will become apparent from the following description of exemplary embodiments (with reference to the attached drawings).

DESCRIPTION OF THE EMBODIMENTS

First Embodiment

Configuration of a Printing System

Figure 1:
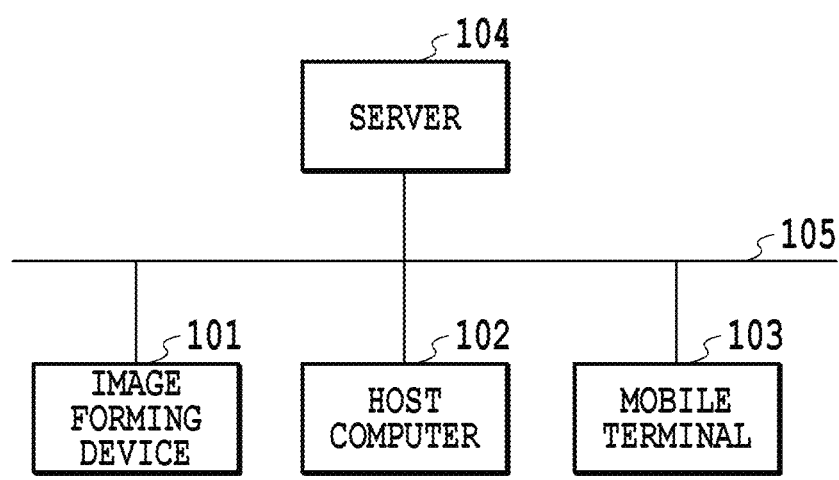
FIG. 1 is a diagram showing a configuration example of a printing system.

FIG. 1 is a diagram showing a configuration example of a printing system according to the present embodiment. As shown in FIG. 1, the printing system includes an image forming device 101, a host computer 102, a mobile terminal 103, and a server 104.

The image forming device 101 is capable of producing a printout in accordance with instructions from the host computer 102, the mobile terminal 103, or the server 104, via a network 105. Further, it is also possible for the image forming device 101 to transmit image data read from a document by utilizing an attached image reading device (not shown) to the host computer 102, the mobile terminal 103, or the server 104. Furthermore, it is also possible for the image forming device 101 to produce a printout of the read image data (to produce a copy output). In the present embodiment, the image forming device 101 functions also as an image processing apparatus for performing various kinds of processing, such as toner saving processing, to be described later.

Hereafter, a description is given on the assumption that a printout of image data received from the host computer 102, the mobile terminal 103, or the server 104 is produced in accordance with instructions therefrom. However, the present embodiment is not limited to such an aspect, and is effective also at the time of producing a copy output of image data read by an image reading device.

[Configuration of Image Forming Device 101]

Figure 2:
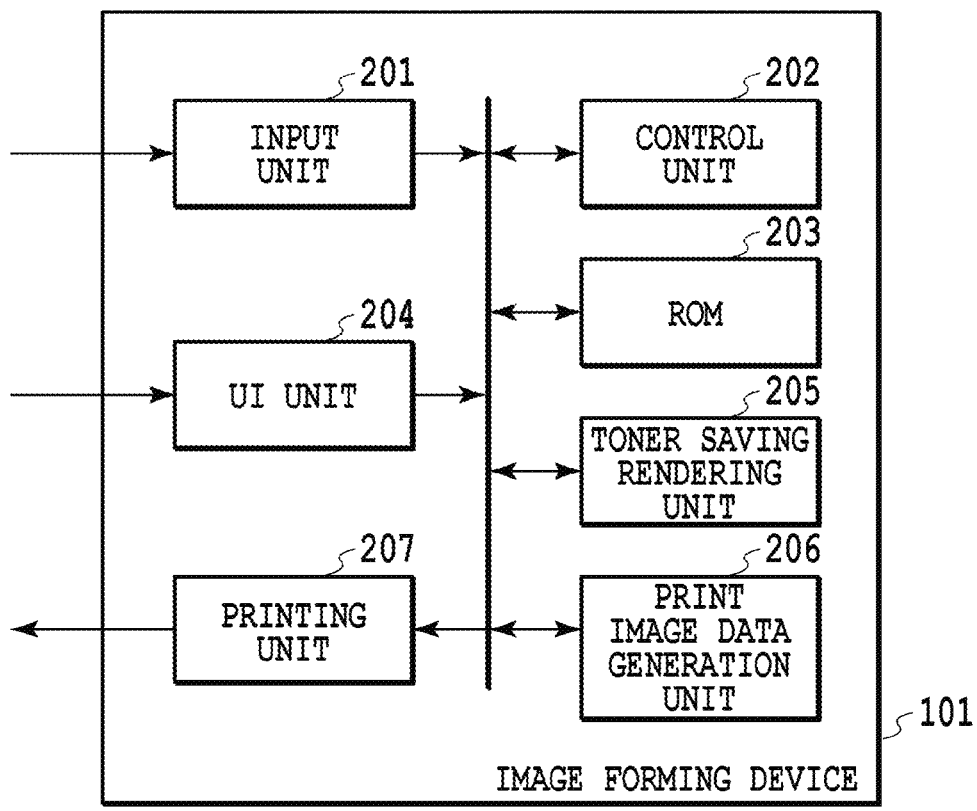
FIG. 2 is a diagram showing a configuration of an image forming device.

FIG. 2 is a diagram showing a configuration of the image forming device 101. As shown in FIG. 2, the image forming device 101 includes an input unit 201, a control unit 202, a ROM 203, a user interface (UI) unit 204, a toner saving rendering unit 205, a print image data generation unit 206, and a printing unit 207.

The control unit 202 controls the operation of each unit of the image forming device 101. The ROM 203 stores various kinds of programs for performing the control of the control unit 202 and the operation of each unit of the image forming device 101.

Figure 3:
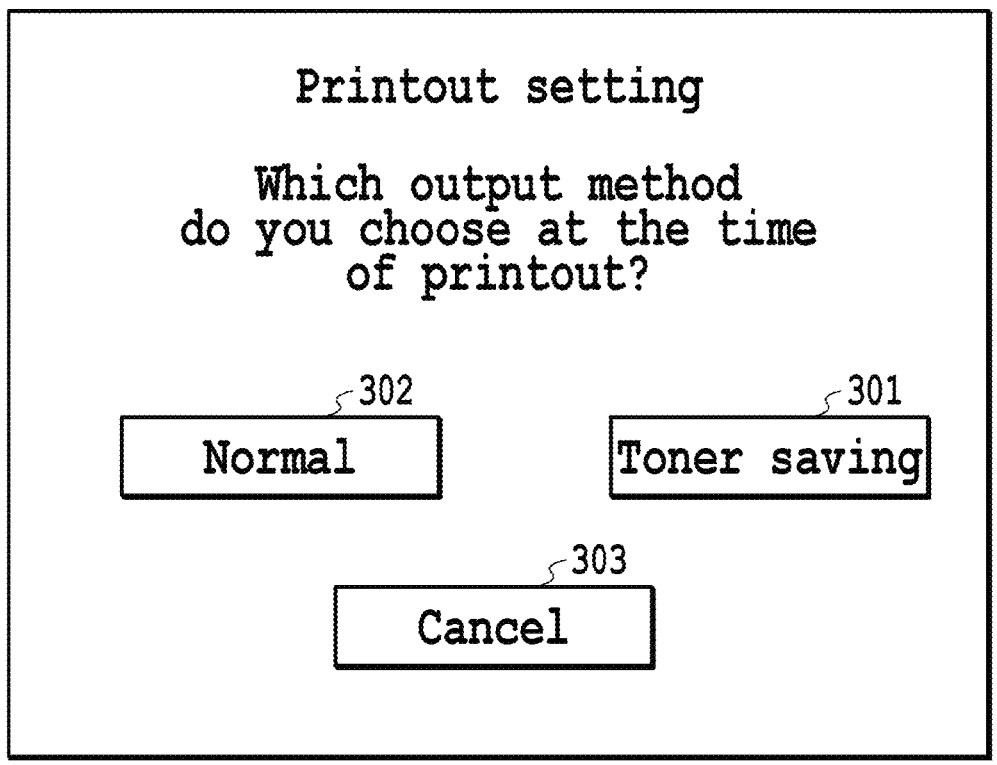
FIG. 3 is a diagram showing an example of a screen of a Printout setting displayed on a user interface (UI) screen.

The user interface (UI) unit 204 is an interface for a user to give instructions of various kinds of operations, and the image forming device 101 receives information on the printing setting in a case when, for example, a toner-saved output is produced via the UI unit 204. FIG. 3 is a diagram showing an example of a screen of a Printout setting displayed on the UI unit 204. In a case when a user presses down a button 301 at the time of producing a printout, a toner-saved output is set. In a case when a button 302 is pressed down, a normal output is produced. A button 303 is a button pressed down at the time of cancellation.

The input unit 201 receives RGB image data from the host computer 102, the mobile terminal 103, the server 104, or the like.

The toner saving rendering unit 205 performs various kinds of processing, including toner saving processing on RGB image data based on instructions, to produce a toner-saved output via the UI unit 204 and generates CMYK bitmap data. Further, the toner saving rendering unit 205 performs various kinds of data processing other than the toner saving processing on RGB image data based on instructions to produce a normal output via the UI unit 204 and generates CMYK bitmap data.

The print image data generation unit 206 generates print image data from the CMYK bitmap data generated by the toner saving rendering unit 205. The generated print image data is provided to the printing unit 207.

The printing unit 207 produces a printout of the print image data.

Figure 16:
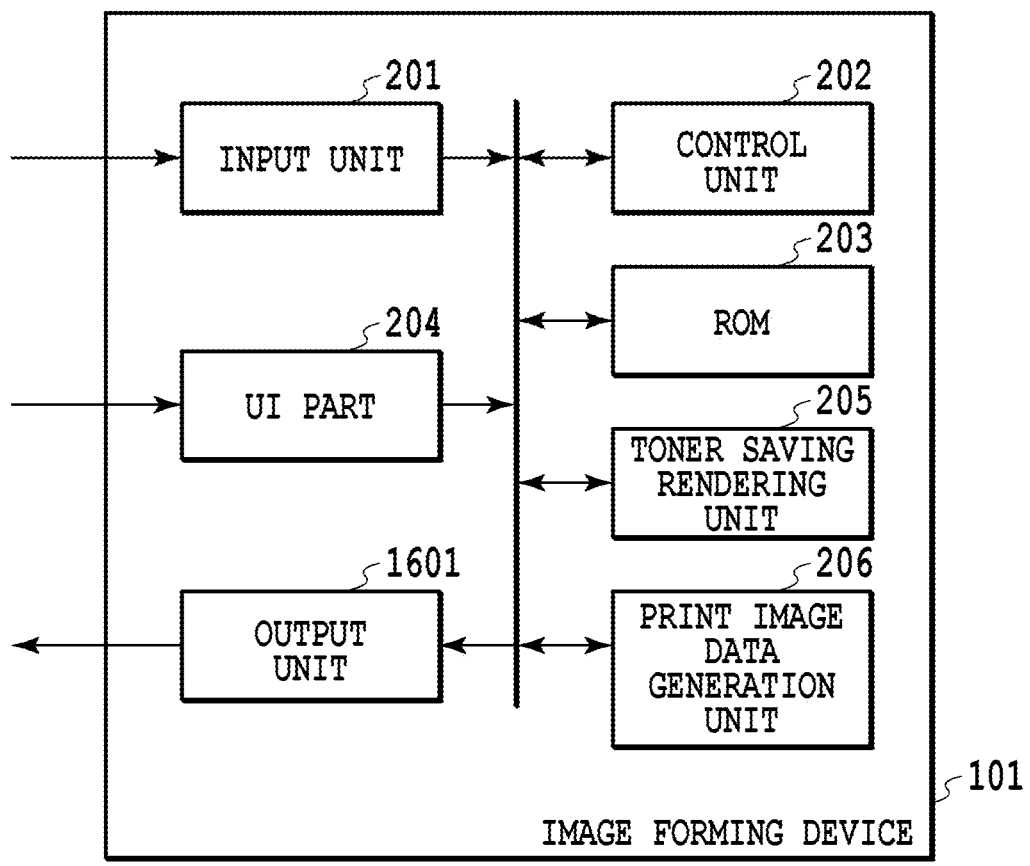
FIG. 16 is a diagram showing a configuration example of a host computer, etc.

In the present embodiment, the various kinds of processing, such as toner saving processing, are performed in the image forming device 101, but the processing may be performed by the host computer 102, the mobile terminal 103, or the server 104. In such a case, the print image data generated through the various kinds of processing in the host computer 102, the mobile terminal 103, or the server 104 is sent to the image forming device 101, and the image forming device 101 produces a printout. FIG. 16 is a diagram showing a configuration of the host computer 102, the mobile terminal 103, or the server 104 in such a case. The input unit 201 to the print image data generation unit 206 are the same as those of the image forming device 101, but the configuration is such that an output unit 1601 is included in place of the printing unit 207. The output unit 1601 transmits generated print image data to the image forming device 101.

[Configuration of Toner Saving Rendering Unit 205]

Figure 4:
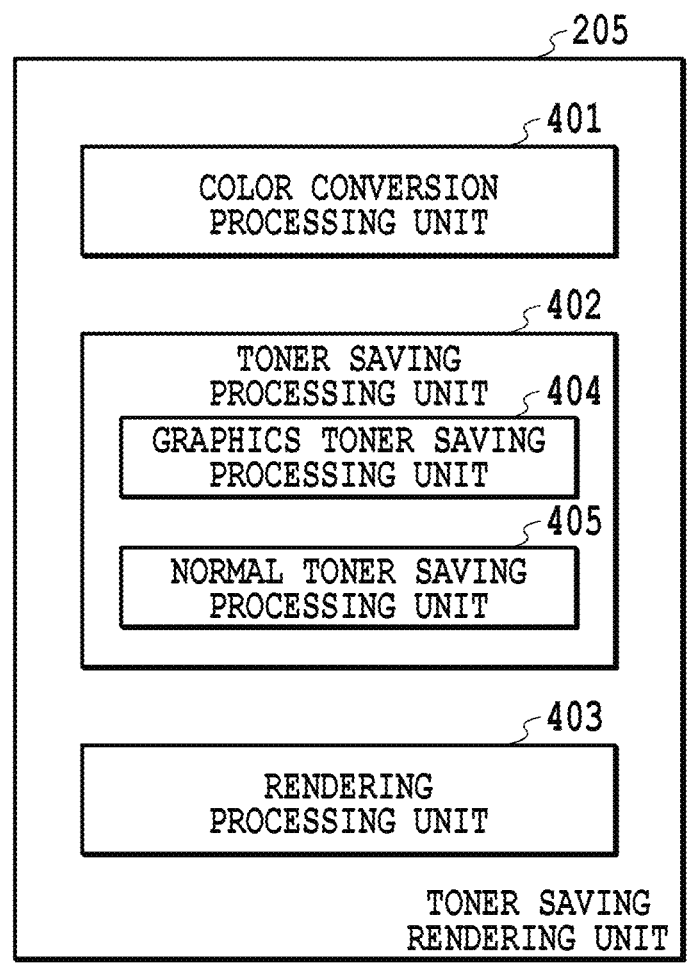
FIG. 4 is a block diagram showing a configuration of a toner saving rendering unit.

FIG. 4 is a diagram showing a configuration of the toner saving rendering unit 205. As shown in FIG. 4, the toner saving rendering unit 205 includes a color conversion processing unit 401, a toner saving processing unit 402, and a rendering processing unit 403.

The color conversion processing unit 401 performs processing to convert RGB image data into CMYK image data. As a method of conversion, it is possible to apply the well-known method for converting RGB into CMYK and an explanation is omitted. The CMYK data after conversion is sent to the toner saving processing unit 402 or the rendering processing unit 403. In other words, in the case when instructions to produce a toner-saved output are given, the CMYK image data after conversion is sent to the toner saving processing unit 402 and toner saving processing (recording material saving processing) is performed. On the other hand, in the case when instructions to produce a normal output are given, the CMYK image data after conversion is sent directly to the rendering processing unit 403, without being subjected to toner saving processing by the toner saving processing unit 402.

The toner saving processing unit 402 includes a graphics toner saving processing unit 404 and a normal toner saving processing unit 405. The toner saving processing unit 402 classifies input CMYK image data according to an object and determines whether or not an object to be processed is a graphics object. In the case when the object is determined to be a graphics object, the graphics toner saving processing unit 404 performs graphics toner saving processing (graphics recording material saving processing) on the object. On the other hand, in the case when it is determined that the object is not a graphics object, the normal toner saving processing unit (non-graphics toner saving processing unit) 405 performs normal toner saving processing (non-graphics recording material saving processing) on the object. Details of the graphics toner saving processing and the normal toner saving processing will be described later.

The rendering processing unit 403 generates CMYK bitmap data from the CMYK image data for which all the toner saving processing is completed, or from the CMYK image data input directly from the color conversion processing unit 401.

[Toner Saving Processing Flow]

Figure 5:
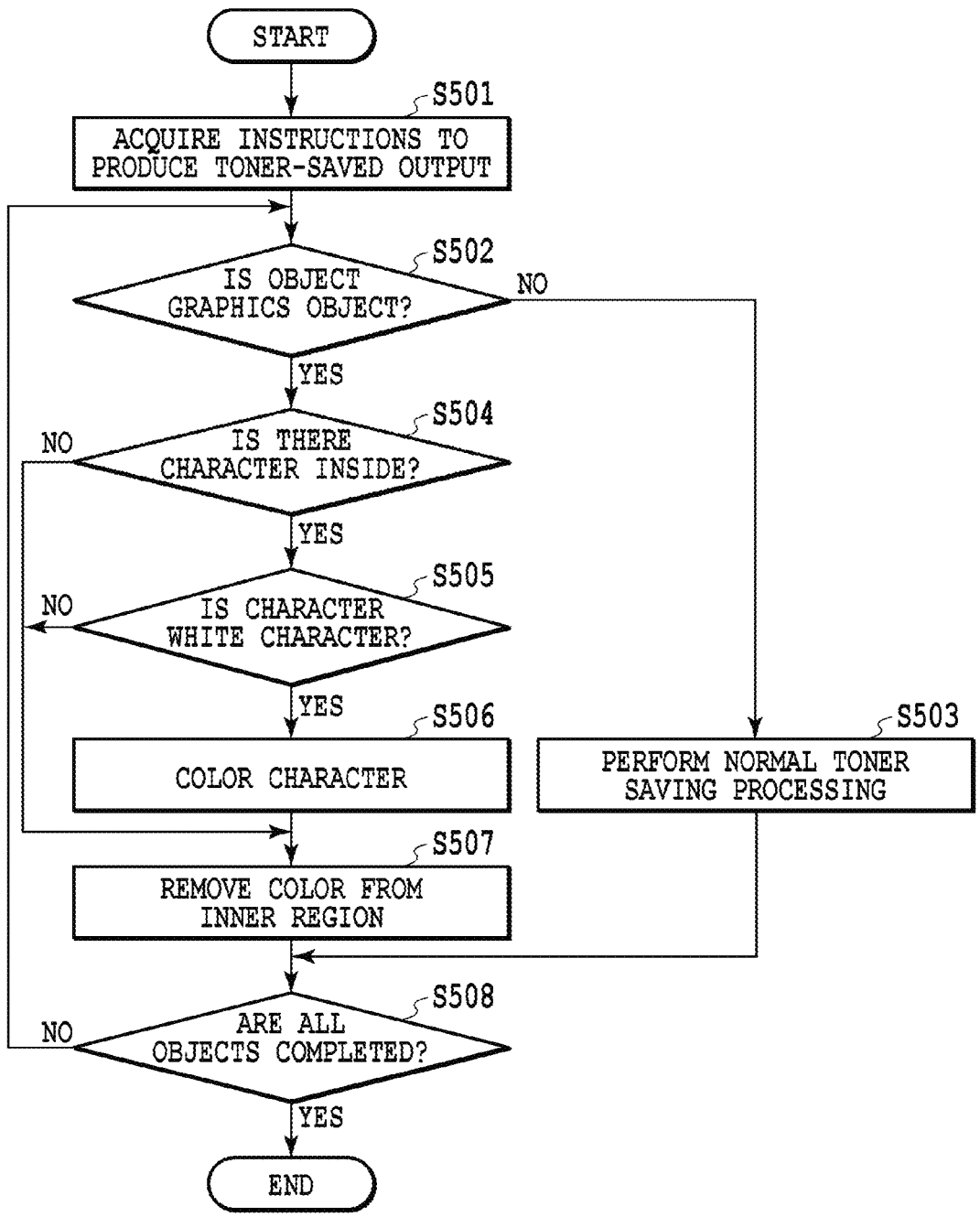
FIG. 5 is a flowchart of toner saving processing according to a first embodiment.

FIG. 5 is a flowchart of the toner saving processing according to the present embodiment. The present flowchart is implemented by the control unit 202 of the image forming device 101 and the toner saving processing unit 402 executing the programs stored in the ROM 203.

At step S501, the control unit 202 receives instructions to produce a toner-saved output via the UI unit 204. Then, the control unit 202 performs control so that the CMYK image data, into which is converted in the color conversion processing unit 401, is input to the toner saving processing unit 402.

At step S502, the toner saving processing unit 402 discriminates objects within the input CMYK image data and determines whether or not each object is a graphics object. The objects to be discriminated include graphics objects, character objects, image objects, etc. It is possible to perform discrimination at the present step based on discrimination information indicative of the attributes of the objects included in the CMYK image data. Further, in the CMYK image data, position information (e.g., coordinates of vertexes) of objects is also included, in addition to the discrimination information. The position information of objects is used for calculation of an object region, to be described later.

Here, object discrimination is explained.

In the case of the printing operation of RGB image data received from the host computer 102, etc., the image data input from the input unit 201 includes discrimination information of objects, and, therefore, it is possible to discriminate each object based on the discrimination information. However, in the case of a copy operation, the bitmap data read by the image reading device is the target, and, therefore, such image data does not include discrimination information of objects. In this case, it is necessary to discriminate each object by separately extracting information of objects from the bitmap data.

In the case of the copy operation, it is possible to discriminate objects, for example, as follows.

First, the bitmap data in the RGB color space read by the image reading device is converted into bitmap data in the CMYK color space, in the color conversion processing unit 401, and input to the toner saving processing unit 402. Then, in the toner saving processing unit 402, edge information is extracted from the CMYK bitmap data and the character region (character object) is discriminated based on the extracted edge information. Further, the position information of the character object is also acquired. Furthermore, the continuity of similar colors is determined from the color values (CMYK) held in the CMYK bitmap data and the graphics region (graphics object), and the other regions (objects other than the graphics object) are discriminated based on the determination result. Still furthermore, the position information of the graphics object and the other objects is also acquired. It may also be possible to discriminate objects directly from the RGB bitmap data without carrying out conversion into the CMYK bitmap data.

In the case when the result of the determination at step S502 is that the object to be processed is not the graphics object, the flow proceeds to step S503. On the other hand, in the case when the object to be processed is the graphics object, the flow proceeds to step S504.

At step S503, the normal toner saving processing unit 405 in the toner saving processing unit 402 performs normal toner saving processing on all the pixels of the objects (objects other than the graphics object) determined to be not the graphics object. Specifically, for example, the CMYK values of all the pixels of the objects are halved equally. Alternatively, it may also be possible to perform processing to reduce the number of dots that require attachment of toner (attachment of recording material) by calculating the AND with a predetermined thinned pattern for all the pixels of the objects. Any other methods may be used as long as the method reduces the amount of consumed toner.

At step S504, the graphics toner saving processing unit 404 in the toner saving processing unit 402 determines whether or not there exists a character object inside the object determined to be the graphics object. Specifically, from the position information of the graphics object, the region of the object is derived, and whether or not the position information of the character object overlaps in the derived region is determined. In the case when the result of the determination is that a character object exists, the flow proceeds to step S505. On the other hand, in the case when no character object exists, the flow proceeds to step S507.

At step S505, the graphics toner saving processing unit 404 determines whether or not the character object is a white character. For example, in the case when all the CMYK data of the character object is zero, it is possible to determine that the character object is a white character. In the case when the result of the determination is that the character object is a white character, the flow proceeds to step S506. On the other hand, in the case when the character object is not a white character, the flow proceeds to step S507.

At step S506, the graphics toner saving processing unit 404 converts the color of the character. For example, in the case when the color of the character is converted into black, the CMYK data of the character object is set to zero once, and then the data is converted into K 255. After the color conversion of the character is completed, the flow proceeds to step S507.

At step S507, the graphics toner saving processing unit 404 detects the edge of the graphics object and removes the color of the inner region surrounded by the detected edge, or decreases the density of the inner region. For example, by setting the CMYK data of the inner region to zero, it is possible to convert the color of the inner region into white.

At step S506 and step S507, it may also be possible to convert the color of the character object and the color of the inner region surrounded by the edge by performing negative-position reversal of the graphics object in which the character object exists.

At step S508, the toner saving processing unit 402 determines whether or not the processing of all the objects included in the input CMYK image data is completed. In the case when the processing is not completed yet, the flow returns to step S502, and the processing is repeated on the next object. On the other hand, in the case when the processing of all the objects is completed, the present processing is exited.

After the toner saving processing is completed, the control unit 202 sends the CMYK image data subjected to toner saving processing to the rendering processing unit 403. Then, in the rendering processing unit 403, the CMYK image data is converted into CMYK bitmap data.

The converted CMYK bitmap data is sent to the print image data generation unit 206 by the control unit 202. Next, generation processing of print image data by the print image data generation unit 206 is explained.

Figure 6:
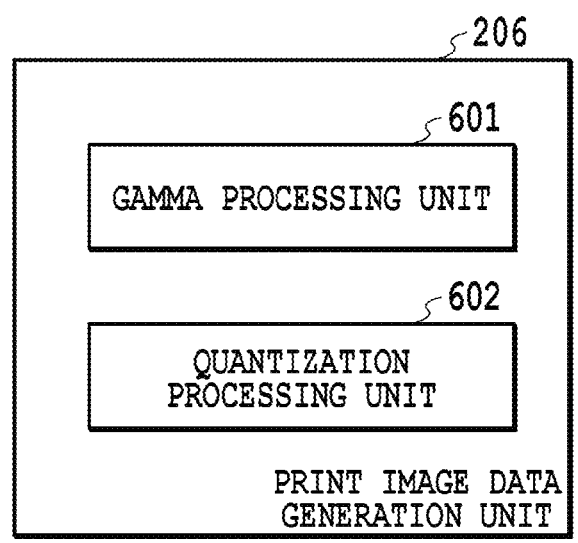
FIG. 6 is a diagram showing a configuration of a print image data generation unit.

FIG. 6 is a diagram showing a configuration of the print image data generation unit 206. As shown in FIG. 6, the print image data generation unit 206 includes a gamma processing unit 601 and a quantization processing unit 602.

The gamma processing unit 601 performs gamma conversion processing in view of the gradation characteristics of the output device on the received CMYK bitmap data. The quantization processing unit 602 converts the CMYK bitmap data after the gamma conversion into color binary data, and generates print image data.

Then, the generated print image data is sent to the printing unit 207 and a printout is produced in the printing unit 207.

Figure 14:
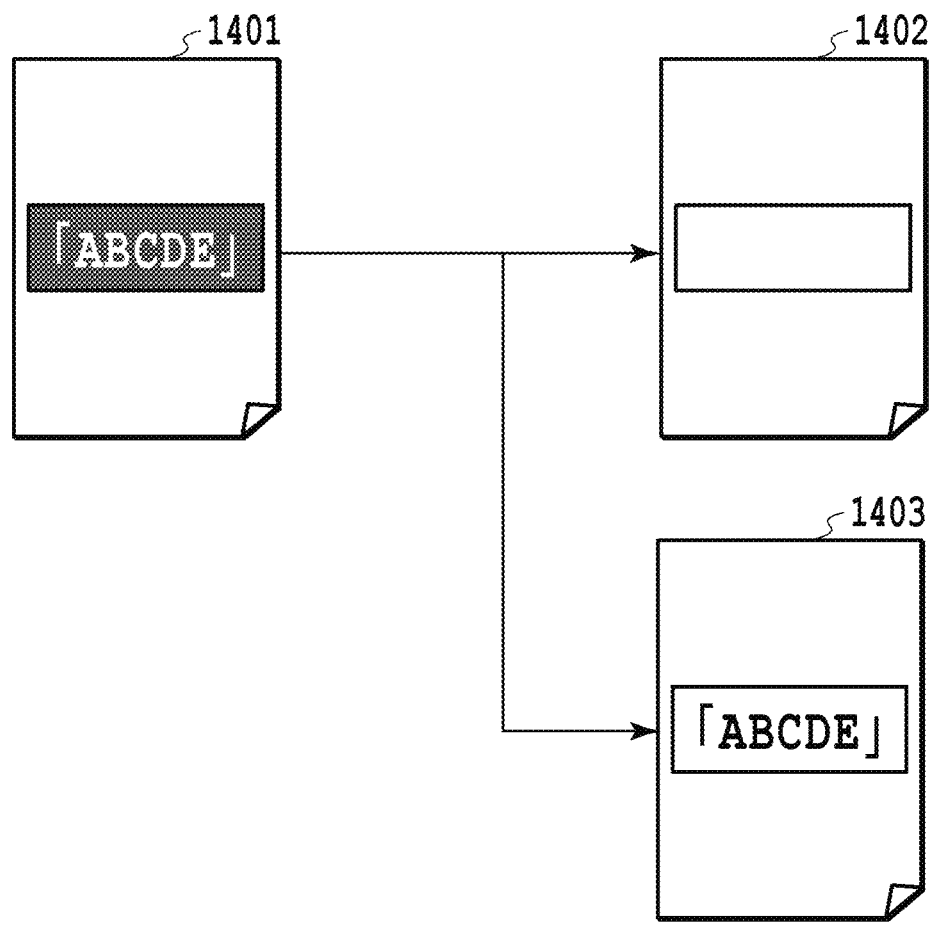
FIG. 14 is an example of an image indicating the effect of the first embodiment.

FIG. 14 is a diagram for explaining the effect of the present embodiment. FIG. 14 shows a printing result 1402 in the case when the present embodiment is not applied to original data 1401 and a printing result 1403 in the case when the present embodiment is applied. At the time of toner saving processing, in the case when a character exists inside a graphics object and toner saving processing is performed, despite that the color of the character is white, visibility of the white character portion is lost as in the printing result 1402. In the case of the toner saving processing in view of the character inside the graphics object being a white character, according to the present embodiment, it is made possible to keep visibility of the character, as shown in the printing result 1403.

As explained above, in the present embodiment, in which the case is taken into consideration in which a white character exists inside a graphics object whose edge is left, and from which colors of other portions are removed at the time of toner saving processing, it is made possible to keep visibility of the white character.

Second Embodiment

The first embodiment is an aspect in which, in the case when a character inside a graphics object is a white character, visibility of the white character is kept. Next, an aspect is explained, in which visibility of a character whose density is low, other than a white character, is also kept.

Figure 7:
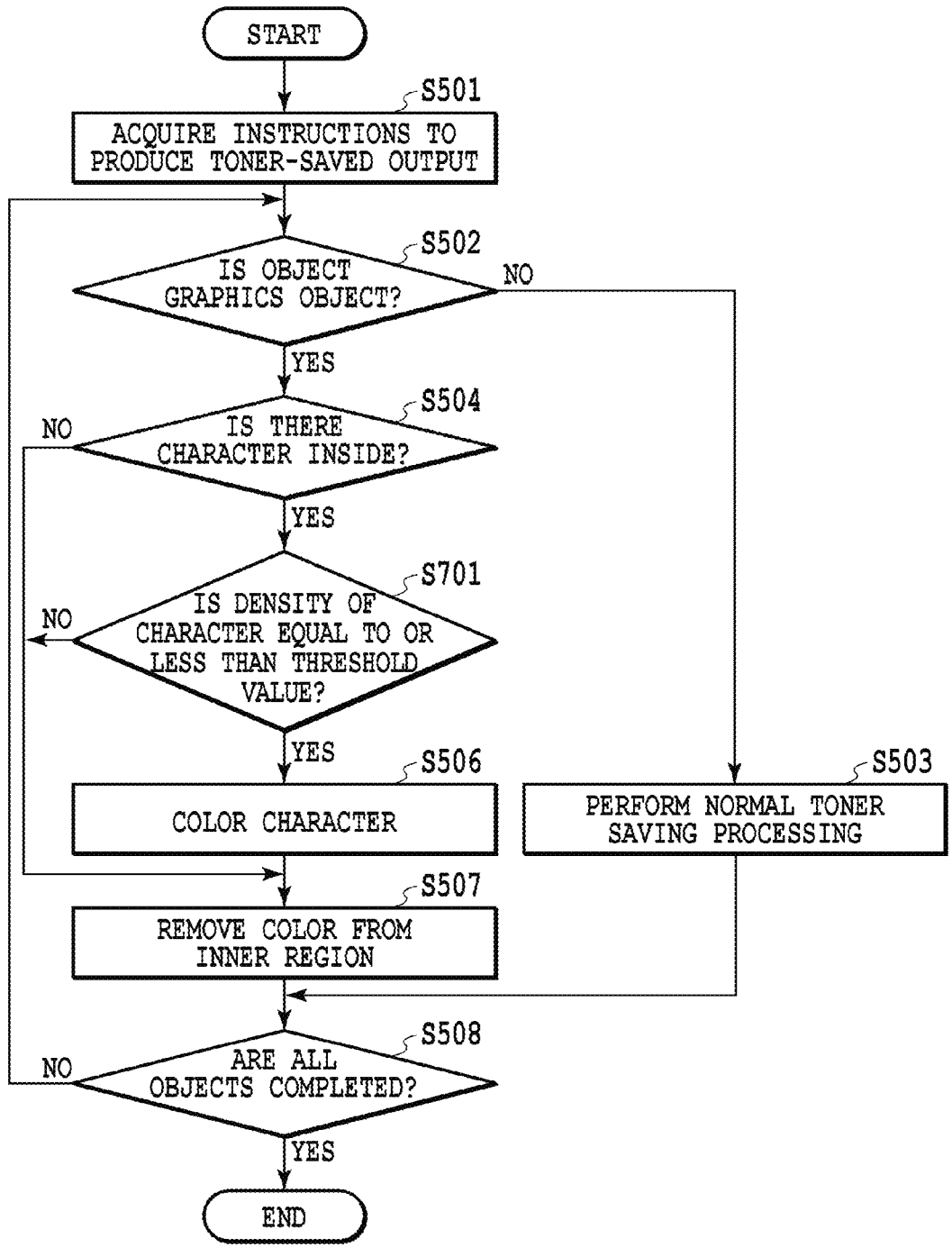
FIG. 7 is a flowchart of toner saving processing according to a second embodiment.

FIG. 7 is a flowchart of toner saving processing according to the present embodiment. The present flowchart is implemented by the control unit 202 of the image forming device 101, and the toner saving processing unit 402 executing the programs stored in the ROM 203.

The processing at step S501 to step S504 is the same as that in the first embodiment, and therefore, an explanation is omitted here. In the case when it is determined that a character object exists inside the graphics object, at step S504, the flow proceeds to step S701.

At step S701, the graphics toner saving processing unit 404 in the toner saving processing unit 402 determines whether or not the density corresponding to the color of the character object is higher than a predetermined density threshold value. For example, in the case when the total value of the CMYK data of the character object is equal to or less than the density threshold value, it is determined than the character is a character whose density is low.

Figure 8:
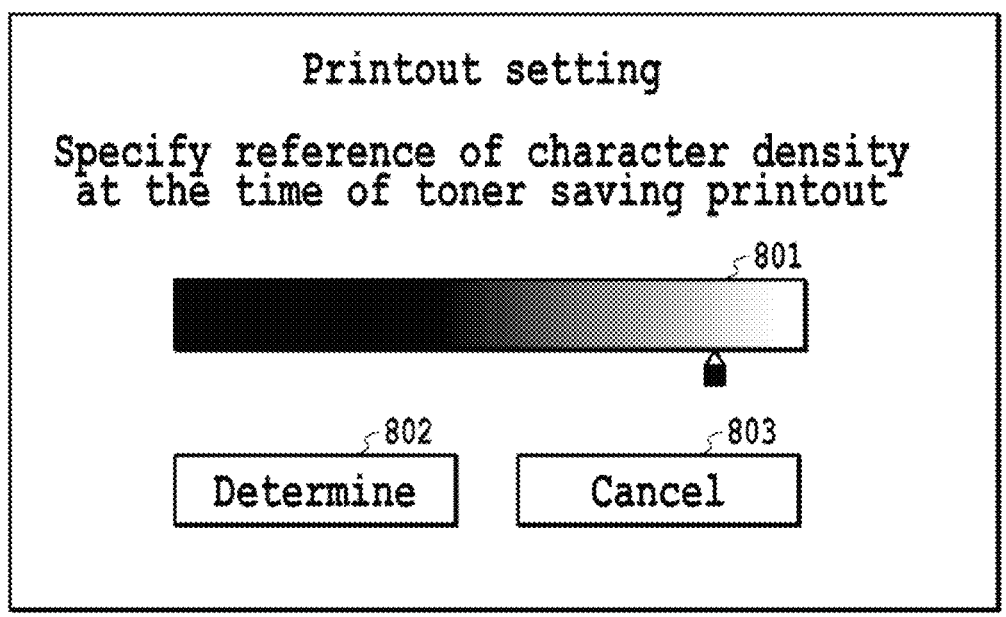
FIG. 8 is a diagram showing an example of a screen of density threshold value setting displayed on a user interface (UI) screen.

FIG. 8 is a diagram showing an example of a setting screen used at the time of setting of a density threshold value by a user. The user operates a slider bar 801 and specifies a density threshold value of characters in such a setting screen as displayed on the UI unit 204. Alternatively, there may be a setting screen on which a desired numerical value is input directly as a density threshold value. After determining a density threshold value to be specified, the user presses down a button 802. A button 803 is a button to make a cancellation. Information on the density threshold value set in this manner is stored in an HDD, etc., not shown, and is sent to the toner saving processing unit 402 by the control unit 202 at the time of determination processing at step S701.

In the case when the result of the determination at step S701 is that the character object is a character whose density is low, the flow proceeds to step S506. In the case when the character object is not a character whose density is low, the flow proceeds to step S507.

At step S506, the graphics toner saving processing unit 404 converts the color of the character. For example, in order to convert the character into black, the CMYK data of the character object is once set to zero, then converted into K 255.

The processing at step S507 and step S508 is the same as that in the first embodiment, and, therefore, an explanation is omitted here.

In the present embodiment, whether a character is a character whose density is low is determined by the density threshold value set in advance, but it may also be possible to determine whether or not a character object is a pale character from, for example, a sample of a printout produced by a user.

As explained above, in the present embodiment, it is also possible to improve visibility of a character whose density is low, other than a white character.

Third Embodiment

At the time of application of the first embodiment, there is a case when it is desirable to change the width of the edge of a graphics object according to the area of the graphics object. The present embodiment provides a mechanism that satisfies such a request.

Figure 9:
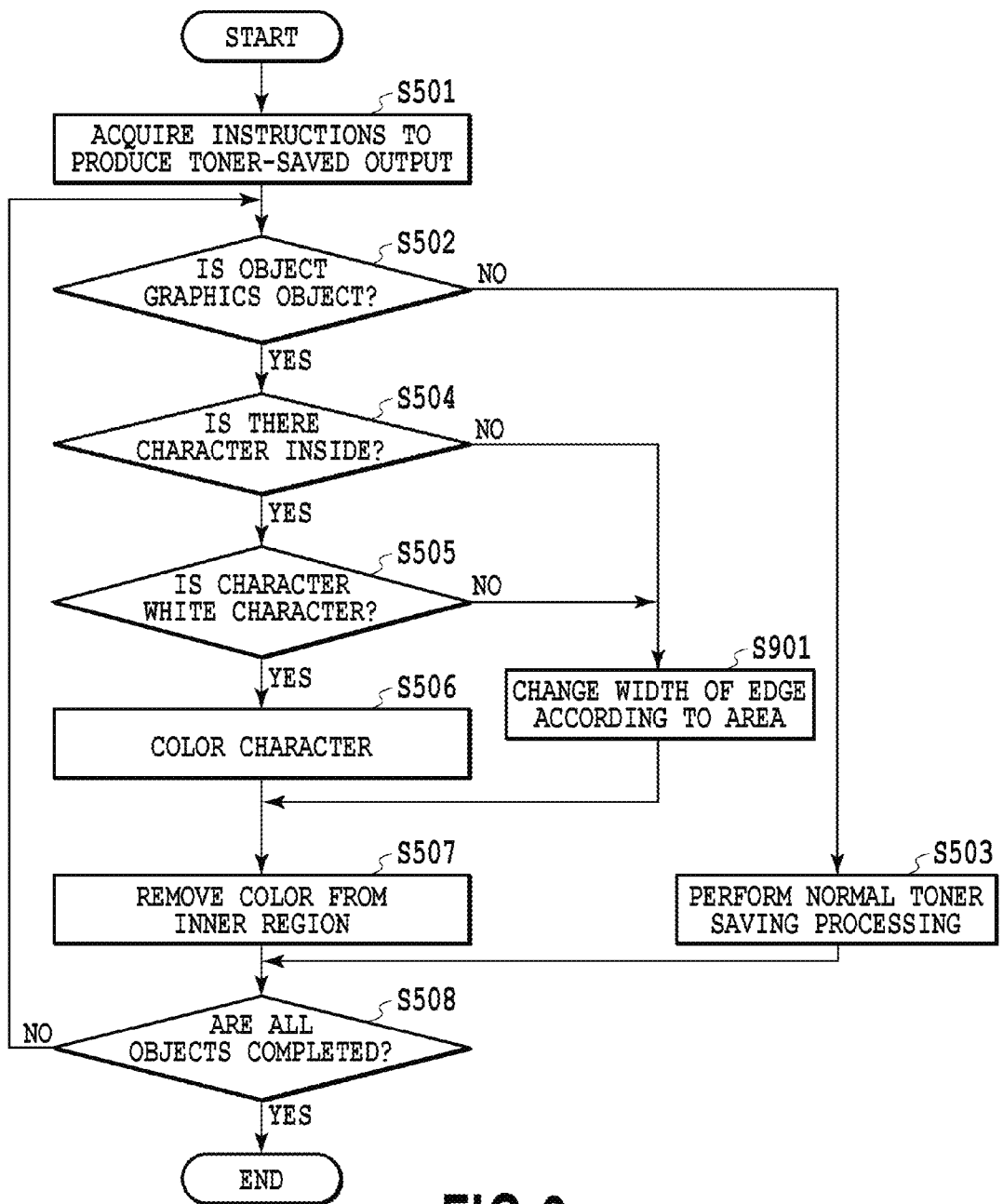
FIG. 9 is a flowchart of toner saving processing according to a third embodiment.

FIG. 9 is a flowchart of the toner saving processing according to the present embodiment. This flowchart is implemented by the control unit 202 of the image forming device 101, and the toner saving processing unit 402 executing the programs stored in the ROM 203.

The processing at step S501 to step S508 is the same as that in the first embodiment, and therefore, an explanation is omitted here. In the case when the determination result at step S504 and step S505 is NO, the flow proceeds to step S901.

At step S901, the graphics toner saving processing unit 404 finds the area from the coordinate points at the time of drawing of the graphics object, as well as detecting the edge of the graphics object, and adjusts the width of the edge to be drawn. Specifically, by referring to a table prepared in advance, in which the relationship between the area and the width of edge is described, the width of the edge, according to the area that is found, is determined.

Figure 10:
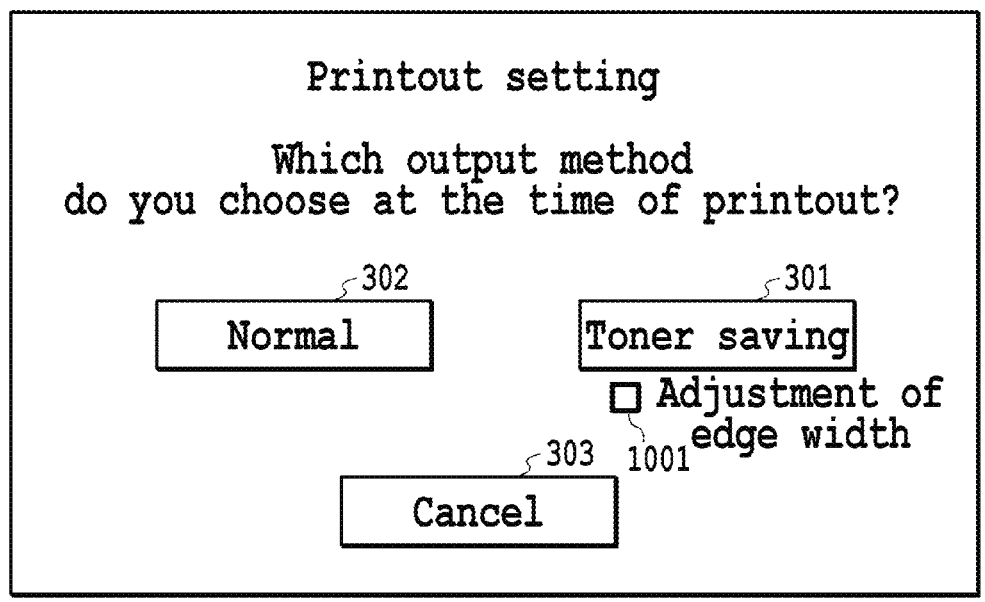
FIG. 10 is a diagram showing an example of a screen of edge width setting displayed on a UI screen.

FIG. 10 is a diagram showing an example of a setting screen used at the time of specifying execution of edge width adjustment by a user. The user specifies whether or not to adjust the width of the edge on the setting screen, such as displayed on the UI unit 204, by using a checkbox 1001. In the case when the button 301 is pressed down in the state when the checkbox 1001 is checked, the width of the edge is adjusted at the time of toner saving.

The information on whether or not to adjust the edge width thus set is saved in the HDD, etc., not shown, and is sent to the toner saving processing unit 402 by the control unit 202 at the time of processing at step S901, and the edge width adjustment is performed in accordance with the contents of the setting.

Figure 15:
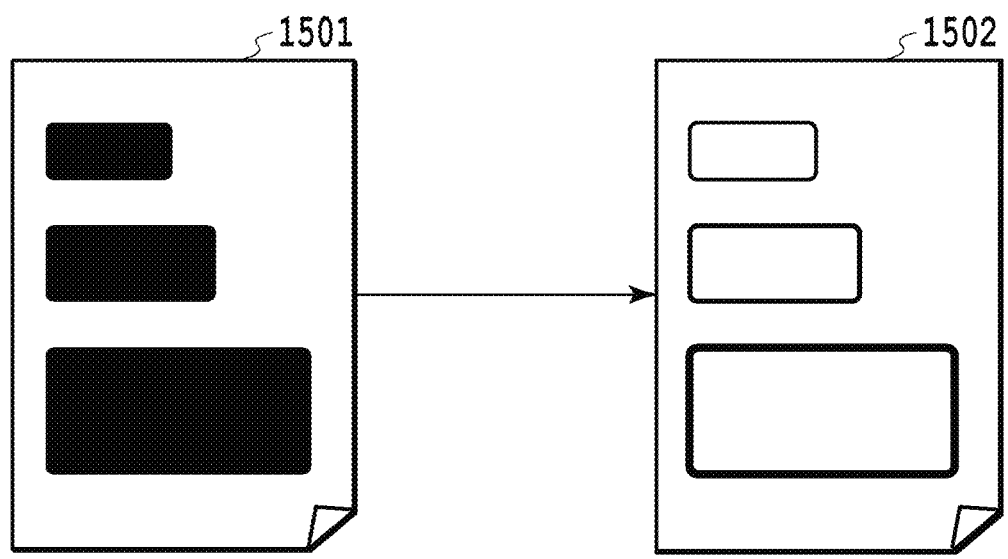
FIG. 15 is an example of an image indicating the effect of the third embodiment.

FIG. 15 is a diagram for explaining the effect of the present embodiment. As shown in a printing result 1502 in FIG. 15, the printout of a graphics object having a large area is produced, so that a wide edge is left. Due to this, it is possible to obtain the visual effect close to that in the case when an output is produced at the time of normal printing.

As explained above, in the present embodiment, the width of the edge is adjusted according to the size of the graphics object, and therefore, it is made possible to represent the size of the graphics object by the width of the edge. Due to this, the visual effect is lost less frequently. The present embodiment is also useful if the graphics object, as a whole, or an inner boundary thereof has the shape of a character.

Fourth Embodiment

At the time of application of the first to third embodiments, in the case when, under a graphics object, other objects exist, it is sometimes desired to make transparent the inner region surrounded by the edge, or to change the color thereof into white. The present embodiment provides a mechanism that satisfies such a request.

Figure 11:
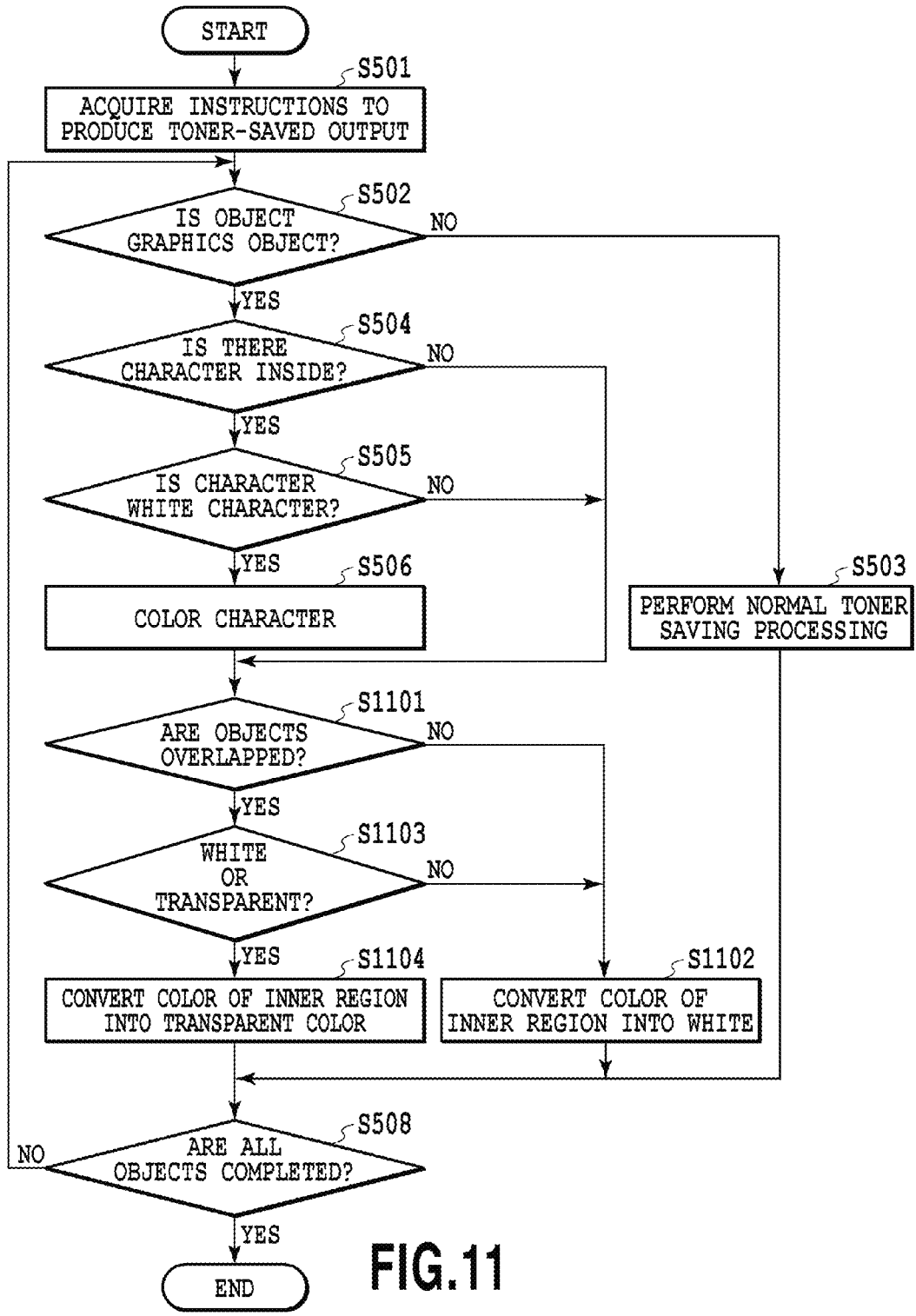
FIG. 11 is a flowchart of toner saving processing according to a fourth embodiment.

FIG. 11 is a flowchart of the toner saving processing according to the present embodiment. The present flowchart is implemented by the control unit 202 of the image forming device 101, and the toner saving processing unit 402 executing the programs stored in the ROM 203.

The processing at step S501 to step S506 is the same as that in the first embodiment, and therefore, an explanation is omitted here. In the case when the determination result at step S504 and at step S505 is NO, the flow proceeds to step S1101 after coloring the character at step S506.

At step S1101, the graphics toner saving processing unit 404 determines whether or not the graphics object overlaps other objects therebelow. Specifically, the region is derived from the position information of the graphics object, and whether or not the region, derived from the position information of other objects overlaps in the derived region of the graphics object, is determined. In the case when there is no overlap, the flow proceeds to step S1102. On the other hand, in the case when there is an overlap, the flow proceeds to step S1103.

At step S1102, the graphics toner saving processing unit 404 detects the edge of the graphics object and converts the CMYK data of the inner region surrounded by the detected edge into white data.

At step S1103, the graphics toner saving processing unit 404 determines whether to convert the CMYK data of the inner region surrounded by the edge of the graphics object into white or transparent data. Specifically, based on the information set in advance, and for specifying the contents of the processing in the case when objects overlap, whether to convert the data into white or transparent data is determined.

Figure 12:
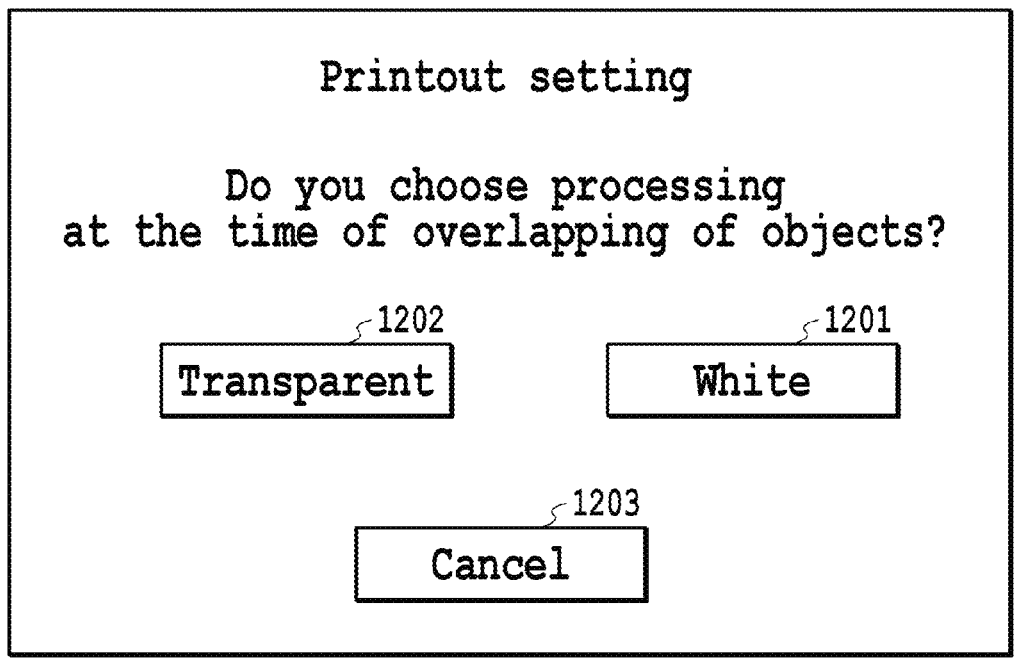
FIG. 12 is a diagram showing an example of a screen of processing setting at the time of overlapping of objects displayed on a UI screen.

FIG. 12 is a diagram showing an example of a setting screen used at the time of specifying the contents of the processing by a user in the case when objects overlap. On the setting screen such as displayed on the UI unit 204, the user specifies operation to convert the CMYK data of the inner region surrounded by the edge of the graphics object into white or transparent data in the case when the graphics object overlaps other objects therebelow. In the case when conversion into transparent data is specified, the object below shows through. The information for specifying the contents of the processing in the case when objects overlap thus set is saved in the HDD etc., not shown, and is sent to the toner saving processing unit 402 by the control unit 202 at the time of determination processing at step S1103 and then is referenced.

In the case when conversion into white data is specified, the flow proceeds to step S1102. In this case, as described previously, the graphics toner saving processing unit 404 detects the edge of the graphics object and converts the CMYK data of the inner region surrounded by the edge into white data. On the other hand, in the case when conversion into transparent data is specified, the flow proceeds to step S1104.

At step S1104, the graphics toner saving processing unit 404 detects the edge of the graphics object and converts the CMYK data of the inner region surrounded by the edge into transparent data. The processing at step S508 after that is the same as that in the first embodiment, and therefore, an explanation is omitted here.

As explained above, in the present embodiment, it is possible for a user to set how to remove color from a graphics object. Due to this, it is made possible to improve image quality in the case when, below a graphics object, other objects exist.

Fifth Embodiment

At the time of application of the first to fourth embodiments, there is a case when it is desired to change the color in which a character object existing on a graphics object is colored to an arbitrary color. The present embodiment provides a mechanism that satisfies such a request.

The toner saving processing according to the present embodiment is basically the same as that of the first embodiment, but the contents at step S506 in the flow in FIG. 5 are different. Specifically, the graphics toner saving processing unit 404 determines the color of the character based on the information set in advance and for specifying the character color. The control unit 202 transmits information on the character color (target color of the character) set on the screen in FIG. 13 on the UI unit 204 to the toner saving processing unit 402. Then, the color of the character is converted based on the information received by the toner saving processing unit 402.

Figure 13:
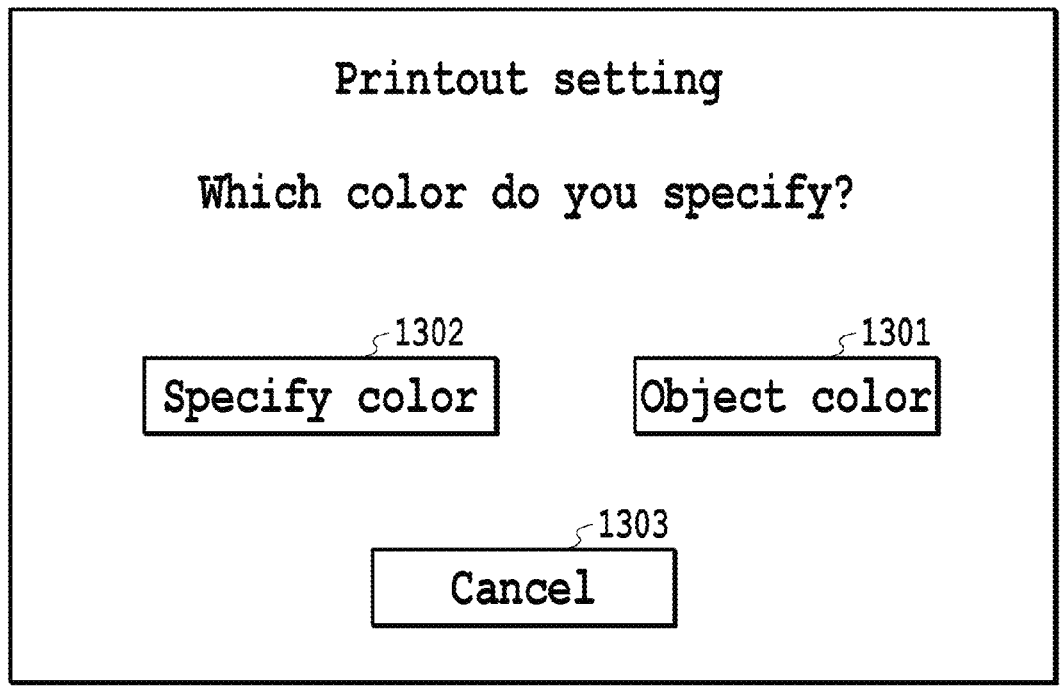
FIG. 13 is a diagram showing an example of a screen of character color setting displayed on a UI screen.

FIG. 13 is a diagram showing an example of a setting screen used at the time of specifying the character color by a user. The user specifies a desired color for the character color on the setting screen, such as displayed on the UI unit 204. Specifically, by pressing down a button 1301, it is specified that the white character is colored in the color inside the graphics object. In this case, the color (target color), in which the white character is colored, is determined based on the color inside the graphics object. Further, by pressing down a button 1302, a slider bar (not shown) of each color appears, and an arbitrary color, in which the white character is colored, is specified. In this case, the color of the portion of the white character is determined to be the specified color.

As explained above, in the present embodiment, in the case when the character that exists inside the graphics object is a white character (or a character whose density is equal to or less than the predetermined density threshold value), it is made possible for a user to select a color for the character.

Further, in each of the embodiments described above, the electrophotographic system is explained as the recording system of the image forming device, but it is possible to apply each of the embodiments to a variety of systems, for example, such as an inkjet recording system, and the gist of the present invention is not limited to the kind of printer. Furthermore, there is no limit to the recording material (toner, ink, etc.) used for printing.

Other Embodiments

Embodiments of the present invention can also be realized by a computer of a system or an apparatus that reads out and executes computer executable instructions recorded on a storage medium (e.g., a non-transitory computer-readable storage medium) to perform the functions of one or more of the above-described embodiment(s) of the present invention, and by a method performed by the computer of the system or an apparatus by, for example, reading out and executing the computer executable instructions from the storage medium to perform the functions of one or more of the above-described embodiment(s). The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
(A) a memory configured to store a control program for recording material saving processing; and (B) a CPU for executing the control program stored on the memory, thereby realizing the following units:
 (a) a determining unit configured to determine (i) whether or not a white character exists inside a graphics object and (ii) whether or not the graphics object overlaps with other objects, wherein a region inside the graphics object other than the white character is an inner region; and
 (b) a conversion unit configured, in a case when the determining unit determines that the white character exists inside the graphics object, (i) to change a color of the white character in order to improve visibility of the white character and (ii) to convert the inner region so as to decrease the density of the inner region, and
 in a case when the determining unit determines that the graphics object overlaps other objects, the conversion unit is further configured one of (i) to change a color of the inner region to be transparent and (ii) to convert the inner region so as to decrease the density of the inner region, based on an input specified by a user.

2. The image processing apparatus according to claim 1, wherein the conversion unit converts the density of the inner region to a density corresponding to white.

3. The image processing apparatus according to claim 2, wherein the conversion unit converts the color of the white character into a color that is determined based on the color of the inner region of the graphics object.

4. The image processing apparatus according to claim 1, wherein the color of the white character to be converted by the conversion unit is set to the color of the inner region or to an arbitrary color, as specified by the user.

5. The image processing apparatus according to claim 1, wherein the conversion unit converts the color of the white character into a color that is determined based on the color of the inner region of the graphics object.

6. An image processing method of performing recording material saving processing on image data, the method comprising the steps of:
 determining whether or not a white character exists inside a graphics object and whether or not the graphics object overlaps with other objects, wherein a region inside the graphics object other than the white character is an inner region; and
 in a case when the determining step determines that the white character exists inside the graphics object, (i) changing a color of the white character in order to improve visibility of the white character, and (ii) converting the inner region by decreasing the density of the inner region, and
 in a case when the determining step determines that the graphics object overlaps other objects, performing one of (i) changing a color of the inner region to be transparent and (ii) converting the inner region so as to decrease the density of the inner region, based on an input specified by a user.

7. The image processing method according to claim 6, wherein the conversion step converts the density of the inner region to a density corresponding to white.

8. The image processing method according to claim 7, wherein the conversion step converts the color of the white character into a color that is determined based on the color of the inner region of the graphics object.

9. The image processing method according to claim 6, wherein the conversion step converts the color of the white character into a color that is determined based on the color of the inner region of the graphics object.

10. The image processing method according to claim 6, wherein the color of the white character to be converted by the conversion step is set to the color of the inner region or to an arbitrary color, as is specified by the user.

11. A non-transitory computer readable storage medium storing a program for causing a computer to perform the steps of:
 determining whether or not a white character exists inside a graphics object and whether or not the graphics object overlaps with other objects, wherein a region inside the graphics object other than the white character is an inner region; and
 in a case when the determining step determines that the white character exists inside the graphics object, (i) changing a color of the white character in order to improve visibility of the white character, and (ii) converting the inner region by decreasing the density of the inner region, and
 in a case when the determining step determines that the graphics object overlaps other objects, performing one of (i) changing a color of the inner region to be transparent and (ii) converting the inner region so as to decrease the density of the inner region, based on an input specified by a user.

12. The storage medium according to claim 11, wherein the conversion step converts the density of the inner region to a density corresponding to white.

13. The storage medium according to claim 12, wherein the conversion step converts the color of the white character into a color that is determined based on the color of the inner region of the graphics object.

14. The storage medium according to claim 11, wherein the conversion step converts the color of the white character into a color that is determined based on the color of the inner region of the graphics object.

15. The storage medium according to claim 11, wherein the color of the white character to be converted by the conversion step is set to the color of the inner region or to an arbitrary color, as is specified by the user.

\* \* \* \* \*